United States Patent
Wang et al.

(10) Patent No.: US 11,990,951 B2
(45) Date of Patent: May 21, 2024

(54) METHOD FOR IMPLEMENTING FAULT DIAGNOSIS BY MEANS OF SPREAD SPECTRUM CARRIER

(71) Applicant: NANJING UNIVERSITY OF AERONAUTICS AND ASTRONAUTICS, Nanjing (CN)

(72) Inventors: Li Wang, Nanjing (CN); Weijia Chen, Nanjing (CN)

(73) Assignee: NANJING UNIVERSITY OF AERONAUTICS AND ASTRONAUTICS, Nanjing (CN)

(*) Notice: Subject to any disclaimer, the term of this patent is extended or adjusted under 35 U.S.C. 154(b) by 0 days.

(21) Appl. No.: 18/005,974

(22) PCT Filed: Oct. 19, 2021

(86) PCT No.: PCT/CN2021/124646
§ 371 (c)(1),
(2) Date: Jan. 19, 2023

(87) PCT Pub. No.: WO2022/100378
PCT Pub. Date: May 19, 2022

(65) Prior Publication Data
US 2023/0327704 A1   Oct. 12, 2023

(30) Foreign Application Priority Data
Nov. 10, 2020 (CN) .......................... 202011246896.3

(51) Int. Cl.
*H04B 3/46* (2015.01)
*H04B 1/7087* (2011.01)
*H04B 3/54* (2006.01)

(52) U.S. Cl.
CPC ............. *H04B 3/46* (2013.01); *H04B 1/7087* (2013.01); *H04B 3/54* (2013.01)

(58) Field of Classification Search
CPC .......... H04B 3/46; H04B 1/7087; H04B 3/54; H04B 3/466; H04B 3/462; H04B 3/48;
(Continued)

(56) References Cited

U.S. PATENT DOCUMENTS

2009/0228223 A1* 9/2009 Liu ...................... G01R 31/008
361/62
2011/0227582 A1* 9/2011 Ahamed ................ G01R 31/11
324/533

FOREIGN PATENT DOCUMENTS

CN       104316834 A       1/2015
CN       104977504 A       10/2015
(Continued)

OTHER PUBLICATIONS

毛健美 等, "混沌扩频多根电缆故障 在线同步诊断研究", 电子学报, 第46卷, 第07期, 2018年7月15日 (Jul. 15, 2018), Mao, Jianmei et al., "Study on online synchronous diagnosis of chaotic spread-spectrum multiple cable faults", Electronics Letters, vol. 46, No. 07.
(Continued)

Primary Examiner — Khanh C Tran
(74) Attorney, Agent, or Firm — PROI Intellectual Property US; Klaus Michael Schmid (57) ABSTRACT

A method for implementing fault diagnosis by means of a spread spectrum carrier includes the following steps: designing incident signal parameters, selecting a spread spectrum sequence for fault detection, determining a center frequency and a sequence length of a spread spectrum code, and segmenting and transforming a power carrier source signal; using the fault detection spread spectrum sequence as a carrier spread spectrum code, and performing spread spectrum modulation on the transformed power carrier source signal to generate an SSPLCR sequence; coupling the SSPLCR sequence to a cable to be tested, and when the cable works normally without failure, transmitting the SSPLCR signal to the receiving terminal via the cable; when the cable fails, reflecting the SSPLCR signal back to the transmitting terminal.

7 Claims, 6 Drawing Sheets (58) Field of Classification Search
CPC .......... H04B 3/487; H04B 3/493; H04B 1/69; H04B 1/707; H04B 2001/6908; H04B 2001/6904; H04B 3/44; H04B 3/542; H04B 3/546
See application file for complete search history.

(56) References Cited

FOREIGN PATENT DOCUMENTS

| CN | 107493120 A | 12/2017 |
|---|---|---|
| CN | 112367098 A | 2/2021 |

OTHER PUBLICATIONS

高闯, "基于TDR/SSTDR 电缆故障诊断方法研究", 中国优秀硕士学位论 文全文数据库 工程科技II辑, 第02期, 2020年 2月 15日 (Feb. 15, 2020), Research on fault diagnosis method based on TDR / SSTDR cables.

Chen Wei 等, "Analysis Of The Technology Of Cable Fault Detection And Location On-Line", Proceedings of the 2011 14th European Conference on Power Electronics and Applications, 2011年 9月 15日 (Sep. 15, 2011).

Mao Jianmei 等, "Research on Online Detection and Location of Multi-Conductor Cables' Faults", 2016 IEEE International Conference on Prognostics and Health Management (ICPHM), 2016年 8月 15日 (Aug. 15, 2016).

\* cited by examiner

METHOD FOR IMPLEMENTING FAULT DIAGNOSIS BY MEANS OF SPREAD SPECTRUM CARRIER

TECHNICAL FIELD

The present disclosure relates to a method for implementing the combination of power carrier and fault detection and positioning based on spread spectrum communication, which belongs to the technical field of carrier communication.

BACKGROUND

In the aerospace system, in order to ensure the high reliability of the system, it is necessary to acquire the state parameters of various parts of the system, so as to detect and diagnose the electrical engineering, airborne measurement and control, flight state, atmospheric data and avionics system state. In order to meet the requirements of system detection and control, it is necessary to acquire data from a large number of sensors and control a large number of actuators, and the number of data transmission lines is correspondingly increased. At the same time, the intellectualization of the aerospace system has the increasing dependence on the engine control and carrier management system. The enrichment of an airborne entertainment system and the improvement of a passenger service system all require high-speed and reliable information transmission, which inevitably leads to the increase of the cable number and weight and the reduction of carrier efficiency in the aerospace system. In order to solve this situation, the Power Line Communication (PLC) technology is introduced. The most important characteristic is to use a power line as the channel to transmit information without laying additional communication lines, and to realize high-speed transmission of information without affecting the quality of power supply. Information transmission based on the characteristics of a power carrier can reduce the construction cost, overcome the defects such as a large number of communication lines, complicated distribution and increased volume and weight brought by traditional communication, improve the carrying efficiency, fundamentally reduce the number and weight of cables, greatly reduce the communication cost, and avoid the construction difficulties of secondary wiring. Therefore, the technology has been widely studied and applied in the automobile, airplane, spacecraft and other fields.

In the aerospace system, the working environment of a power line is complex, which is affected by frequent vibration caused by long-time flight. The power line rubs against hard surfaces such as aircraft structures, destroying the insulation layer of wires. At the same time, the internal wires of the aircraft will be damaged due to the age of the aircraft, the influence of water, radiation, high temperature and chemical corrosion, and the stress during normal use and maintenance. The aging and insulation degradation of the power line will produce electric arc and electromagnetic radiation, which will gradually endanger a conductor layer, resulting in power line disconnection, grounding, short circuit and other faults, interrupting the transmission of carrier data and endangering the normal operation of the avionics system. This may result in power failure of important airborne devices, chain reaction and fatal impact on the whole power supply system, and even serious loss of life and property. However, the space and lines of aircraft cable wiring are very limited. It is difficult to troubleshoot. It takes a long time to repair. Routine maintenance will cause the aircraft to stop, and the cost of replacing the wire system is high. Therefore, the key to reduce the maintenance cost of aircraft wire faults lies in the rapid and accurate fault identification and positioning of wire faults.

Among all kinds of methods about fault detection and accurate positioning, Spread Spectrum Time Domain Reflectometry (SSTDR) uses spread spectrum communication technology, which is referred to as SSCT and makes use of the sharp autocorrelation of a pseudo-random code to identify and position faults. The positioning accuracy is high, and the anti-interference ability is strong. At the same time, due to the high center frequency and the wide bandwidth of the pseudo-random code, the spread spectrum signal has little influence on the original power signal, which can realize online detection.

Spread spectrum communication is applied to a power carrier, so as to obtain the ability to resist man-made interference, narrow-band interference and multipath interference. Spread spectrum communication modulates the spectrum of the information signal to be transmitted with a pseudo-random code, spreads the spectrum to become a broadband signal, and then sends the signal to the channel for transmission. At the receiving terminal, the same code is used to receive, despread and recover the transmitted information data in a related synchronization manner. By increasing the channel bandwidth, even in the case of low signal-to-noise ratio, the channel can reliably transmit information with the same capacity. When the signal is submerged by noise, reliable communication can be maintained as long as the bandwidth of the transmitted signal is correspondingly increased.

When the spread spectrum technology is used for ranging, if the spread spectrum is wide, it means that the used spread spectrum code rate is high, and the time occupied by each code is very short. When the transmitted spread spectrum signal is reflected back from the measured object, the spread spectrum code sequence is demodulated at the receiving terminal, and then the phase difference between the transmitted code sequence and the received code sequence is compared, so that the round-trip time difference of the spread spectrum signal can be accurately measured, and the distance therebetween can be calculated. The narrower the code, the wider the spread spectrum, and the higher the accuracy.

In U.S. Pat. No. 7,868,621 B2, Liu et al. from Honeywell company, a method is introduced, in which an aircraft power distribution system based on a power line carrier uses a PLC technology and an SSTDR fault diagnosis method to provide key maintenance functions. The main contribution lies in that, different from the traditional aircraft power distribution system which can only detect and position a line feeder before power-on, the present disclosure can realize real-time online fault detection and positioning. The main method is to add the SSTDR fault detection device to an PLC modem, and inject an SSTDR detection signal into a power distribution system through a PLC tap point, so as to realize the online detection and positioning of the power line fault of the aircraft power distribution system.

However, the patent still has the following problems.

(1) when the SSTDR fault detection module is added to the PLC system, the volume, weight and cost of the fault detection device of the power distribution system are increased.

(2) The SSTDR fault detection system injects detection signals into the power line through the PLC tap point. The carrier communication signals and the fault detection signals coexist in the channel. The two carrier signals have partial frequency spectrum overlap, which reduces their signal-to-noise ratios and interferes with each other, making it difficult to recover the carrier signals, and affecting the synchronization of the carrier communication function and the fault detection function.

SUMMARY

The purpose of the present disclosure is to propose a method for implementing fault diagnosis by means of a spread spectrum carrier, namely spread spectrum power line communication reflectometry (SSPLCR), aiming at the defects and deficiencies existing in the prior art. In this method, the source signal of a power carrier is segmented and transformed, and then a pseudo-random code is used to perform spread spectrum on the transformed source signal. Finally, a sine wave is used for modulation, so as to generate the SSPLCR signal which can realize fault detection and information transmission, which fundamentally solves the problems of device increase and signal crosstalk caused by the coexistence of SSTDR fault detection and the PLC system, reduces the external hardware detection devices, reduces the volume and cost of the hardware device, and realizes the miniaturization, low-cost and low-power design of the hardware device. When the cable fails, the fault reflection signal is sampled at the transmitting terminal, the incident signal and the fault reflection signal are synchronized, and the synchronized one-cycle incident signal and the fault reflection signal are intercepted for correlation operation, so as to judge the fault type and calculate the fault distance. At the receiving terminal, the digital Delay-Locked Loop (DLL) is used to precisely synchronize the signal received by the carrier, and then despreading and demodulation are performed using the correlation operation to recover the power carrier source signal.

The present disclosure relates to a method for implementing fault diagnosis by means of a spread spectrum carrier, comprising the following steps:
a first step, determining a center frequency and a sequence length of a fault detection spread spectrum code, and generating m sequence and a sine signal satisfying the requirements as an SSPLCR signal spread spectrum code and an SSPLCR signal modulation code;
a second step, setting a fault detection cycle;
a third step, converting a source signal carrying carrier information into a binary sequence, segmenting the source signal binary sequence according to the set fault detection cycle, and inserting the same binary sequence containing only 0 or 1 at the segment from the beginning bit to the end of the binary sequence to form a new source signal binary sequence;
a fourth step, performing periodic spread spectrum modulation on the new source signal binary sequence with the m sequence and the sine wave generated to generate an SSPLCR signal;
a fifth step, when the cable works normally, sampling the SSPLCR signal transmitted via the cable at the receiving terminal, synchronizing the SSPLCR signal with the locally generated PN code, and recovering the power carrier information carried by the SSPLCR signal through despreading and demodulation to realize data transmission; when the cable fails, sampling an SSPLCR fault reflection signal at the transmitting terminal, synchronizing the SSPLCR fault reflection signal with an incident signal, performing phase adjustment and optimization on the SSPLCR fault reflection signal, and then performing correlation operation and normalization processing on the incident signal to judge the type and position of the cable fault.

Further, the method for determining a center frequency and a sequence length of an SSPLCR spread spectrum code in the first step comprises:
according to the frequency bandwidth of the operating voltage of the cable to be tested, determining the minimum value of the starting value of the frequency spectrum of the spread spectrum code, so that the frequency $f_1$ of the spread spectrum code can be obtained; according to the length of the cable to be tested, determining the order n of the spread spectrum code, wherein the maximum distance of the n-order spread spectrum code is $$2^{n-1} \times v \times \frac{1}{f_1},$$

where v is the transmission rate of the signal in the cable.

Further, the method for setting the fault detection time interval in the second step comprises:
in the first step, determining and selecting the n-order m sequence as the spread spectrum code, in which n≥5, the number of m sequence bits is $2^n-1$, the spread spectrum detection sequence $S_1$ has a frequency is $f_1$, and the source sequence carrying power carrier information is $S_2$ with the frequency $f_2$. The bit length of the source signal is a times of the cycle of m sequence, that is, $$\frac{a(2^n - 1)}{f_2} = \frac{1}{f_1},$$

in which a≥10;
performing the fault detection and the fault diagnosis at the receiving terminal once at intervals of $t_{10}$. The fault detection cycle $t_{10}$ should be k times of $a(2^{n-1})/f_2$. Comprehensively considering the requirements of fault diagnosis frequency and the requirements of interval time, k should be an integer not less than 10, and the fault detection cycle $t_{10}$ should be set.

Further, the method of forming a new source signal binary sequence $S_3$ in the third step comprises:
according to the size of the fault detection cycle $t_{10}$ determined in the second step, that is, k times of one code duration of the source signal binary sequence $S_2$, inserting the binary sequence containing only 0 or 1 every k codes from the beginning bit to the end of the binary source sequence to form a new source signal binary sequence $S_3$ with a frequency of $f_2$, which is the same as that of the original source signal binary sequence.

Further, the method of forming an SSPLCR signal in the fourth step comprises:
Step 1, using the m sequence generated in the first step as a spread spectrum code, and performing periodic spread spectrum on a new source signal binary sequence;
Step 2, modulating the periodic spread spectrum signal obtained in Step 1, wherein the modulation mode is BPSK, the frequency of the modulated sine wave is $f_1$, which is the same as the frequency of the m sequence code, and the SSPLCR signal is obtained after modulation; the signal has the power line carrier communication function and the power line fault detection and positioning ability, and the signal is used as a detection signal for digital-to-analog conversion, signal modulation and coupling into the power line for information transmission and fault diagnosis.

Further, the method of synchronizing the SSPLCR signal sampled by the receiving terminal with the locally generated PN code in the fifth step comprises:

Step 1, creating a local PN code generator at the receiving terminal to generate an m sequence, which is consistent with the frequency, series and primitive polynomial of the m sequence generated at the transmitting terminal;

Step 2, roughly synchronizing the received signal by using a sliding synchronization module: inputting the product of the local PN code and the received signal into an integral judgment subsystem, performing integral operation, comparing the obtained integral value with a set threshold, judging whether the two signals are synchronized or not, and outputting a synchronization signal, wherein in this process, a phase search control module always controls a PN code generation module to adjust the code phase according to the synchronization signal, and if the output value of the integrator exceeds the threshold at a certain moment, it is regarded as successful capture;

Step 3: using a digital delay-locked loop to precisely synchronize the received signal.

Further, the method of despreading and demodulating the synchronization signal at the receiving terminal in the fifth step comprises:

Step 1, multiplying the synchronized local PN code with the received signal, filtering by an intermediate frequency filter, removing the carrier frequency of a modulated signal, and keeping a fundamental frequency signal;

Step 2, performing zero-crossing judgement on the output signal of the intermediate frequency filter, wherein it is judged as 1 if the output value is greater than 0, otherwise it is judged as 0; adding a counting judgment module to make $2^n-1$ zero-crossing judgment in a code cycle, where n is the series of the local PN code; when the detected zero-crossing times are greater than or equal to $2^{n-1}$, considering that the source signal is 1 in the code cycle; otherwise, judging that the source signal is 0 in the code cycle.

Further, the method of judging the type and position of the cable fault in the fifth step comprises:

Step 1, regarding the starting time the same as the starting time of sending the SSPLCR signal, and sampling the fault reflection signal of the receiving terminal with the fault detection time interval $t_{10}$ as a cycle, wherein the sampling length is twice of the code cycle;

Step 2, performing phase calibration on the sampled fault signal and the sent SSPLCR sequence; intercepting the sampling signal from the time of 0 code, 1 code . . . n codes, wherein the duration of intercepting the sampling point is one code cycle length; performing correlation operation on the intercepted sampling signal and the one-cycle spread spectrum code, respectively, calculating the size of a primary reflection peak, ranking the obtained primary reflection peak, performing comprehensive analysis combined with the spectrum energy value, and selecting the number m of delay codes capable of reflecting the fault information and amplifying the fault peak most obviously;

Step 3: from the m-th code time, intercepting the sampling signal of one code cycle length on the sampled fault signal, performing correlation operation with the one-cycle spread spectrum code, performing normalization processing, extracting the fault peak, judging the fault type, and positioning the fault distance.

The present disclosure has the following beneficial effects.

1. The method first transforms the source signal and inserts a specific detection sequence code, which can realize the sampling of incident and reflected sequences in a certain period in the process of long sequence data transmission. Compared with the SSTDR system, which injects a detection spread spectrum code and samples reflection signals at the same time, the transformed source signal contains power carrier information, while ensuring the efficiency and frequency of fault detection. At the same time, because a specific code is inserted into the source signal, the adverse effect on the correlation operation of fault detection caused by the change of the autocorrelation and cross-correlation characteristics of the incident sequence after spread spectrum modulation due to the continuous change of the phase of the randomly changing source signal is avoided.

2. The method generates an SSPLCR incident signal which can realize power carrier and fault detection and positioning at the same time, thus avoiding the problem that in the traditional method, in order to realize power carrier communication and fault detection at the same time, two signals are injected into the cable at the same time, and the source information cannot be recovered due to mutual interference caused by frequency spectrum overlapping. At the same time, the method dynamically integrates the power carrier communication function with the fault detection function, and does not need a fault diagnosis device and a power carrier device to realize the two functions respectively, thus reducing the volume, weight and cost of the device, realizing the miniaturization, low-cost and low-power consumption design of the hardware device, effectively improving the reliability and maintainability of a power transmission and communication system, and being beneficial to market promotion.

3. When recovering and extracting the carrier signal, the method proposes to use the digital delay-locked loop to despread the spread spectrum power carrier, and combine a sliding synchronization capture module to synchronize the local synchronous PN code with the received signal, so as to reduce the synchronization error to less than 0.1 code. The method solves the problem of nonintegral delay of signals in the cable transmission process, and improves the accuracy of a power carrier.

4. The method proposes a phase calibration method in determining the fault type and positioning the fault distance, which solves the problem of a plurality of peaks in fault detection by sampling multi-cycle fault reflection spread spectrum carrier signals and incident spread spectrum carrier signals for correlation operation. A periodic reflection signal which finally performs correlation operation with the spread spectrum code is selected by an algorithm. Compared with the traditional method, which uses single-cycle sampling reflection signals to perform correlation operation with the spread spectrum code, the method can enlarge the fault peak and increase the longest fault detection distance. Compared with the traditional SSTDR system, the SSPLCR system can realize the fault detection function with the same performance while carrying power carrier information.

The technical scheme of the present disclosure can be widely applied to low-voltage and high-voltage power systems of airplanes, ships and electric vehicles.

DETAILED DESCRIPTION OF THE EMBODIMENTS

Some key technologies involved in the present disclosure are described in detail with reference to the attached drawings hereinafter to support the claims.

Figure 1:
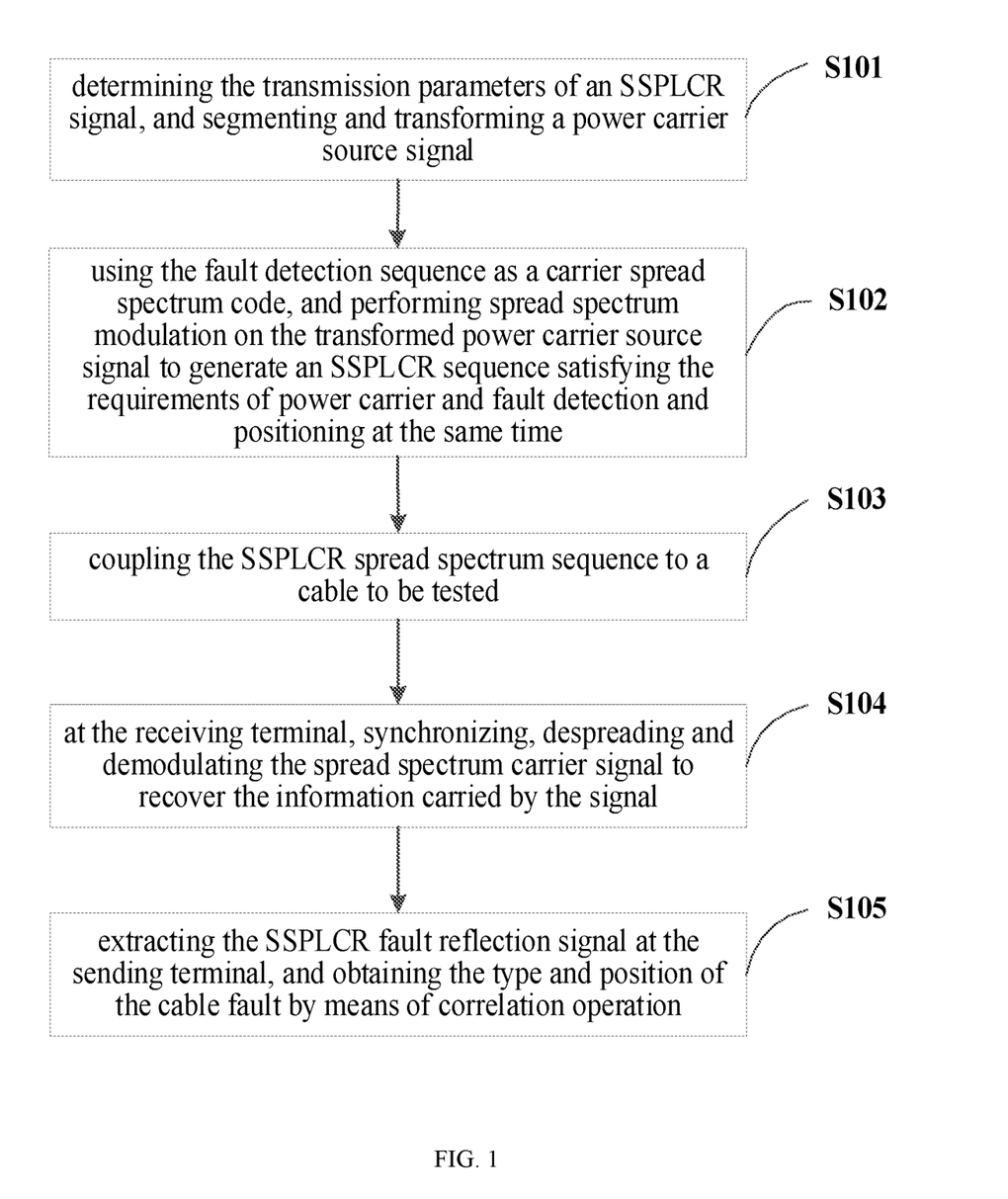
FIG. 1 is a flowchart of a spread spectrum power carrier SSPLCR method according to the present disclosure.

As shown in FIG. 1, the method for implementing fault diagnosis by means of a spread spectrum carrier according to the embodiment of the present disclosure comprises the following steps:

S101, determining the transmission parameters of an SSPLCR signal, and segmenting and transforming a power carrier source signal;

S102, using the fault detection sequence as a carrier spread spectrum code, and performing spread spectrum modulation on the transformed power carrier source signal to generate an SSPLCR sequence satisfying the requirements of power carrier and fault detection and positioning at the same time;

S103, coupling the SSPLCR spread spectrum sequence to a cable to be tested, and when the cable works normally without failure, transmitting the signal to the receiving terminal via the cable; when the cable fails, reflecting the spread spectrum signal back to the receiving terminal because the impedance of the fault point changes;

S104, at the receiving terminal, synchronizing, despreading and demodulating the spread spectrum carrier signal to recover the information carried by the signal;

S105, extracting the fault reflection signal at the transmitting terminal, and obtaining the type and position of the cable fault by means of correlation operation. The method realizes the integration of power transmission, data transmission and fault diagnosis, and improves the reliability and maintainability of a power transmission and communication system.

Figure 2:
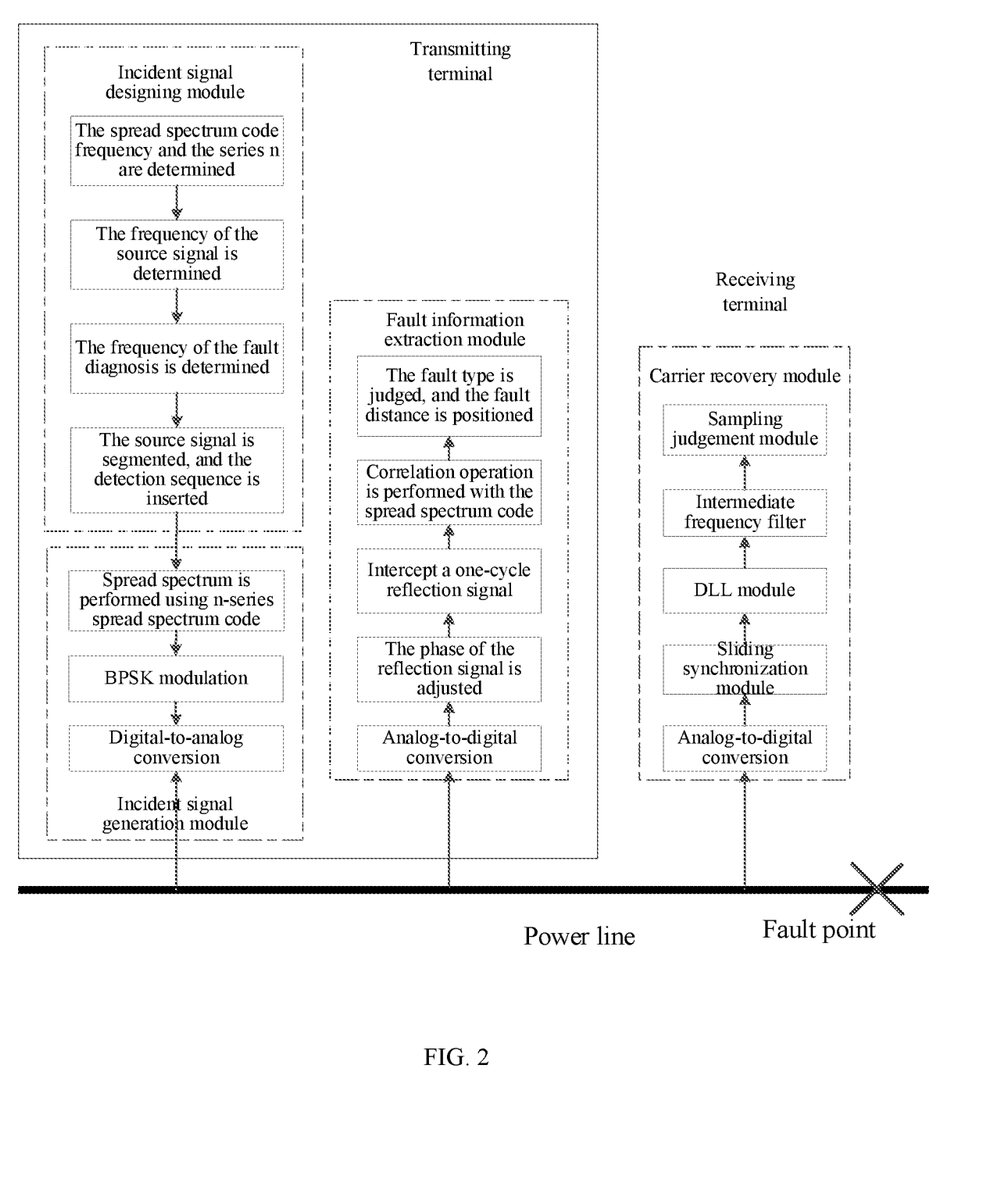
FIG. 2 is a schematic block diagram of a spread spectrum power carrier SSPLCR method according to the present disclosure.

The implementation principle of the method for implementing fault diagnosis by means of a spread spectrum carrier according to the embodiment of the present disclosure is shown in FIG. 2.

At the signal transmitting terminal, according to the physical characteristics of the cable to be tested, the transmission parameters of the incident signal in time-frequency domain are determined, and the center frequency and the series of the spread spectrum code are determined. According to the timeliness requirement of fault detection, the interval time of fault detection is determined, and the source sequence is segmented and transformed. Spread spectrum modulation is performed on the new source code to generate an SSPLCR incident signal with power carrier and fault detection functions. The time-frequency domain incident signal is injected into the cable after digital-to-analog conversion, and a sampling module is provided at the transmitting terminal. When the cable fails, impedance mismatch occurs at the fault point, and the incident signal is reflected at the fault point. The reflection signal is sampled at the transmitting terminal, the phase of the sampled reflection signal is adjusted, and correlation operation is performed with the spread spectrum code to judge the fault type and position.

At the receiving terminal of the signal, the SSPLCR signal transmitted via the cable is sampled and synchronized with the locally generated PN code. The synchronized received signal is despread and demodulated to recover the source signal and realize high-speed data transmission of a power carrier.

The present disclosure will be further described with reference to the following specific embodiments.

As a preferred embodiment, the method for determining the transmission parameters of the time-frequency domain incident signal according to the embodiment of the present disclosure is as follows.

According to the frequency bandwidth of the operating voltage of the cable to be tested, the minimum value of the starting value of the frequency spectrum of the spread spectrum code is determined, and the frequency $f_1$ of the spread spectrum code is determined.

According to the length of the cable to be tested, the order n of the spread spectrum code is determined, wherein the maximum distance of the n-order spread spectrum code is $$2^{n-1} \times v \times \frac{1}{f_1},$$

where v is the transmission rate of the signal in the cable.

The n-order m sequence is selected as the spread spectrum code, in which $n \geq 5$, the number of m sequence bits is $2^n - 1$, and the binary sequence $S_1$ as the detection signal has a frequency is $f_1$.

A method of segmenting and transforming power carrier source signals according to the embodiment of the present disclosure is as follows.

1) the source signal binary sequence carrying power carrier information is $S_2$, and the source signal frequency $f_2$ is determined. The bit length of the binary sequence code of the source signal is a times of the cycle of m sequence, that is, $$\frac{a(2^n - 1)}{f_2} = \frac{1}{f_1},$$

in which $a \geq 10$.

2) the fault detection cycle $t_{10}$ is set, and the fault detection and the fault diagnosis at the receiving terminal are performed once at intervals of $t_{10}$. The fault detection cycle $t_{10}$ should be k times of $a(2^{n-1})/f_2$. Comprehensively considering the requirements of fault diagnosis frequency and the requirements of interval time, k should be an integer not less than 10.

3) according to the size of the fault detection cycle $t_{10}$, that is, k times of one code duration of the source signal binary sequence $S_2$, the binary sequence containing only 0 or 1 is inserted every k codes from the beginning bit to the end of the binary source sequence to form a new source signal binary sequence $S_3$ with a frequency of $f_2$, which is the same as that of the original source signal binary sequence.

The method of generating an SSPLCR incident signal according to the embodiment of the present disclosure is as follows:

(1) using the detection signal binary sequence $S_1$ as a spread spectrum code, and performing periodic spread spectrum on a newly generated source signal binary sequence $S_3$;

(2) modulating the periodic spread spectrum signal obtained in the previous step, wherein the modulation mode is BPSK, the frequency of the modulated sine wave is $f_1$, which is the same as the frequency of the m sequence code, and the SSPLCR signal is obtained; the signal has the power line carrier communication function and the power line fault detection and positioning ability, and the signal is used as a detection signal for digital-to-analog conversion, signal modulation and coupling into the power line for information transmission and fault diagnosis.

Figure 3:
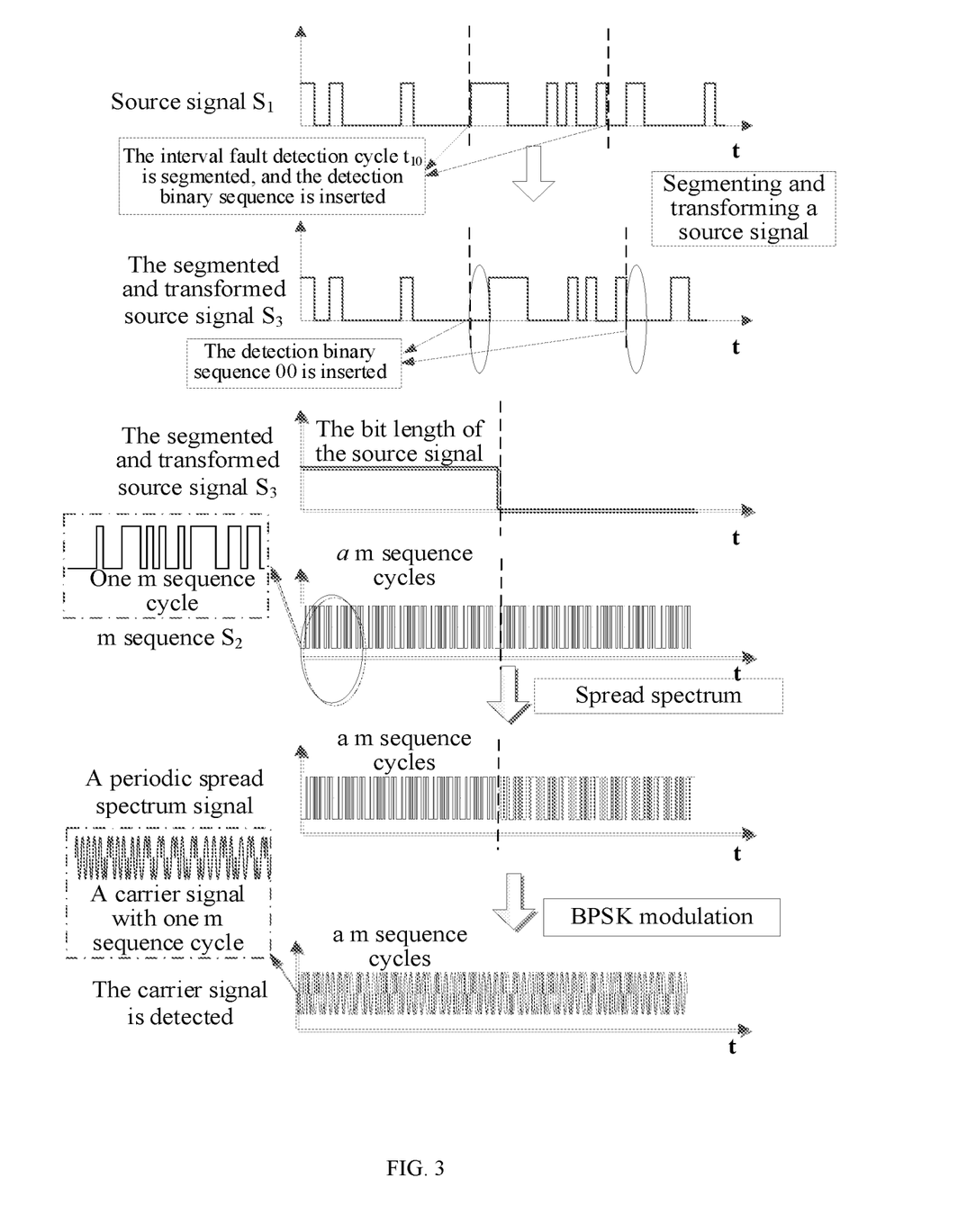
FIG. 3 is a schematic diagram of a method of generating an SSPLCR incident signal.

FIG. 3 is a schematic diagram of a method of generating an incident signal with fault detection function carried by a spread spectrum carrier. First, a 00 sequence is inserted into the source sequence every ten bytes as the detection sequence. Second, spread spectrum is performed on the transformed source signal using the m sequence. Finally, the sequence after spread spectrum is subjected to BPSK modulation by the sine wave.

As a preferred embodiment, in the embodiment of the present disclosure, the method of synchronizing the SSPLCR signal sampled at the receiving terminal with the locally generated PN code is as follows.

Step 1: a local PN code generator is created at the receiving terminal to generate an m sequence, which is consistent with the frequency, series and primitive polynomial of the m sequence (that is, the detection signal binary sequence $S_1$) generated at the transmitting terminal.

Step 2: the received signal is roughly synchronized by using a sliding synchronization module:

the product of the local PN code and the received signal is input into an integral judgment subsystem, integral operation is performed, the obtained integral value is compared with a set threshold, it is judged whether the two signals are synchronized or not, and a synchronization signal is output;

in this process, a phase search control module always controls a PN code generation module to adjust the code phase according to the synchronization signal, and if the output value of the integrator exceeds the threshold at a certain moment, it is regarded as successful capture.

Step 3: a digital delay-locked loop is used to precisely synchronize the received signal.

As a preferred embodiment, the method for despreading and demodulating the synchronization signal at the receiving terminal according to the embodiment of the present disclosure is as follows:

Step 1: multiplying the synchronized local PN code with the received signal, filtering by an intermediate frequency filter, removing the carrier frequency of a modulated signal, and keeping a fundamental frequency signal;

Step 2: performing zero-crossing judgement on the output signal of the intermediate frequency filter, wherein it is judged as 1 if the output value is greater than 0, otherwise it is judged as 0; adding a counting judgment module to make $2^n-1$ zero-crossing judgment in a code cycle, where n is the series of the local PN code; when the detected zero-crossing times are greater than or equal to $2^{n-1}$, considering that the source signal is 1 in the code cycle; otherwise, judging that the source signal is 0 in the code cycle.

Figure 4:
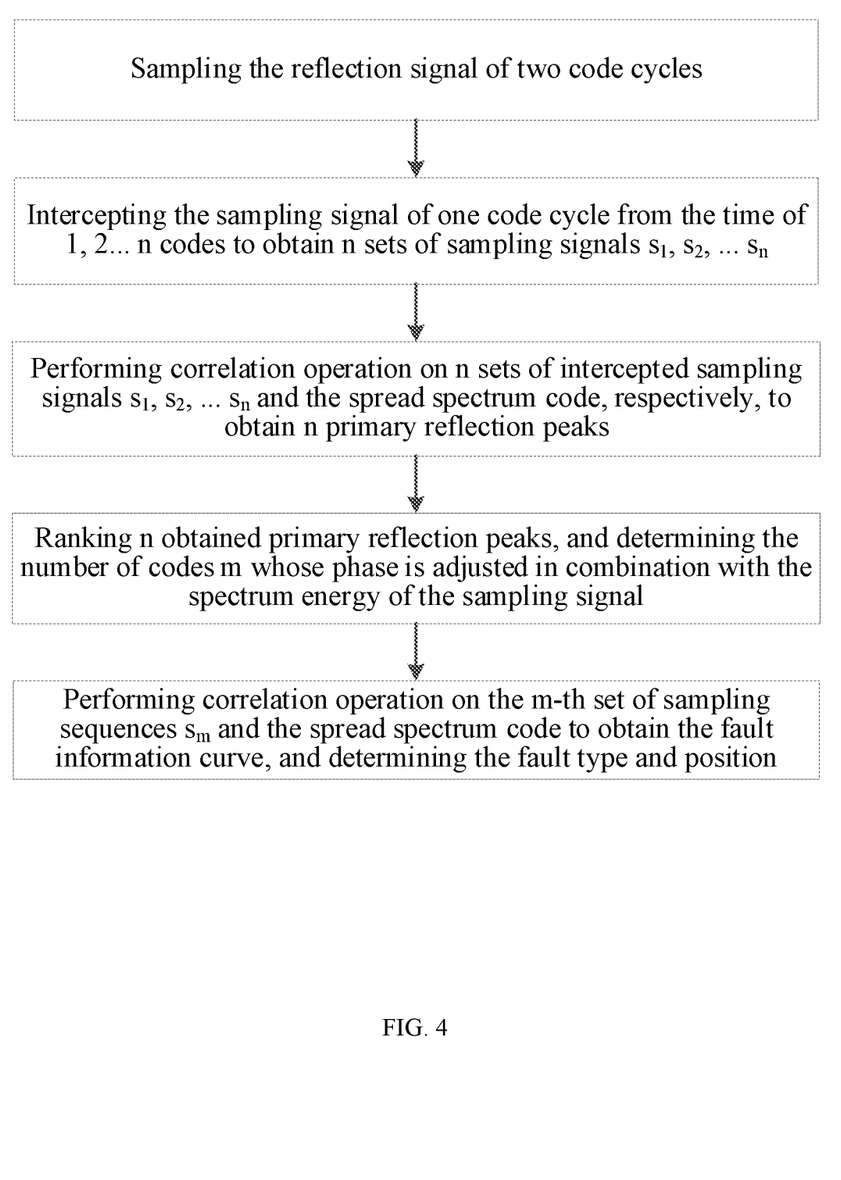
FIG. 4 is a flowchart of a method of adjusting the phase of a spread spectrum signal at a receiving terminal.

As shown in FIG. 4, as a preferred embodiment, the method of fault diagnosis and positioning according to the embodiment of the present disclosure is as follows:

i. regarding the starting time the same as the starting time of sending the SSPLCR signal, and sampling the fault reflection signal of the receiving terminal with the fault detection time interval $t_{10}$ as a cycle, wherein the sampling length is twice of the code cycle;

ii. performing phase calibration on the sampled fault signal and the sent SSPLCR sequence;

intercepting the sampling signal from the time of 0 code, 1 code . . . n codes, wherein the duration of intercepting the sampling point is one code cycle length; performing correlation operation on the intercepted sampling signal and the one-cycle spread spectrum code, respectively, calculating the size of a primary reflection peak, ranking the obtained primary reflection peak, performing comprehensive analysis combined with the spectrum energy value, and selecting the number m of delay codes capable of reflecting the fault information and amplifying the fault peak most obviously;

iii. from the k-th code time, intercepting the sampling signal of one code cycle length on the sampled fault signal, performing correlation operation with the one-cycle spread spectrum code, performing normalization processing, extracting the fault peak, judging the fault type, and positioning the fault distance.

In this embodiment, the SSPLCR system is simulated on the Matlab/Simulink platform. An incident signal generation module, an isolation and coupling module, a cable module, a carrier signal despreading and demodulating module and a fault information extraction module are constructed. The center frequency of the incident signal is set as 62.5 MHz, and the power carrier frequency is 0.492 MHz. The cable module is set to extract the power carrier information at 25 m, and the open circuit fault is set at 30 m.

Figure 5:
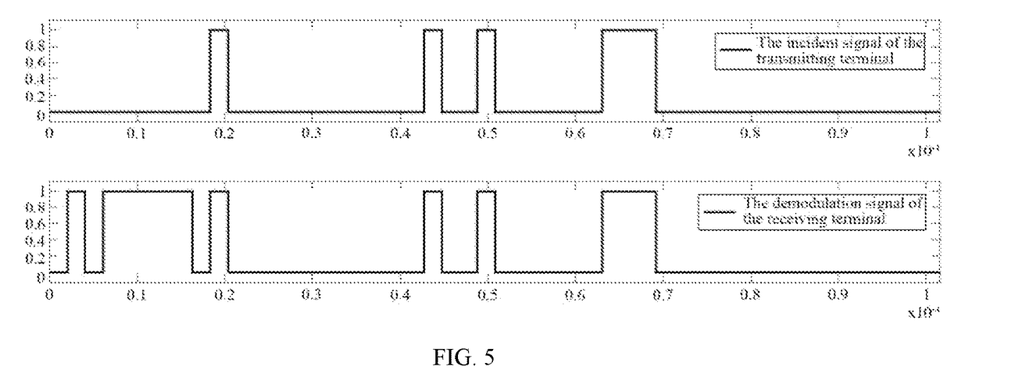
FIG. 5 is a waveform of source data transmission between a transmitting terminal and receiving terminal of an SSPLCR system.

FIG. 5 shows a schematic diagram of a transmission waveform of a transmitting terminal and a receiving terminal of an SSPLCR system when a carrier communication system works normally. As can be seen from the figure, due to the delay caused by signal transmission in the cable, after a period of synchronization, the received signal is synchronized with the transmitted signal, thus realizing accurate transmission.

Figure 6:
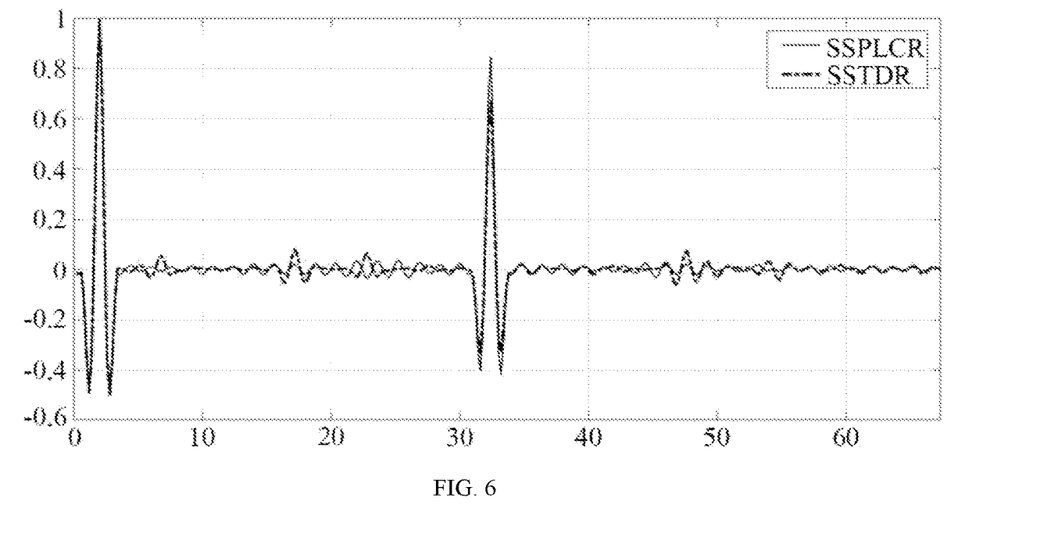
FIG. 6 is a comparison diagram of implementing fault diagnosis by an SSPLCR method and obtaining power line fault information curves by an SSTDR method.

FIG. 6 is a comparison diagram of implementing fault diagnosis by a spread spectrum power line communication reflectometry method and obtaining power line fault information curves by a traditional SSTDR method under open circuit fault. Both fault diagnosis methods can diagnose the fault type, and the positioning fault distance is 30.4 m with a relative error of 1.3%. Compared with the traditional SSTDR method, the spread spectrum power line communication reflectometry can amplify the fault peak and reduce the difficulty of fault point identification to some extent.

To sum up, although the basic structure, principle and method of the present disclosure are described in detail by the above embodiments, on the premise of not departing from the gist of the present disclosure, according to the above enlightenment, those skilled in the art can implement the transformation/substitution forms or combinations with-

What is claimed is:

1. A method for implementing fault diagnosis by means of a spread spectrum carrier, comprising the following steps:
    a first step, determining a center frequency and a sequence length of a fault detection spread spectrum code, and generating m sequence and a sine signal satisfying the requirements as an spread spectrum power line communication reflectometry (SSPLCR) signal spread spectrum code and an spread spectrum power line communication reflectometry (SSPLCR) signal modulation code;
    a second step, setting a fault detection cycle;
    a third step, converting a source signal carrying carrier information into a binary sequence, segmenting the source signal binary sequence according to the set fault detection cycle, and inserting the same binary sequence containing only 0 or 1 at the segment from the beginning bit to the end of the binary sequence to form a new source signal binary sequence;
    a fourth step, performing periodic spread spectrum modulation on the new source signal binary sequence with the m sequence and the sine wave generated to generate an SSPLCR signal;
    a fifth step, when the cable works normally, sampling the SSPLCR signal transmitted via the cable at the receiving terminal, synchronizing the SSPLCR signal with the locally generated PN code, and recovering the power carrier information carried by the SSPLCR signal through despreading and demodulation to realize data transmission; when the cable fails, sampling an SSPLCR fault reflection signal at the transmitting terminal, synchronizing the SSPLCR fault reflection signal with an incident signal, performing phase adjustment and optimization on the SSPLCR fault reflection signal, and then performing correlation operation and normalization processing on the incident signal to judge the type and position of the cable fault.

2. The method for implementing fault diagnosis by means of a spread spectrum carrier according to claim 1, wherein the method of setting the fault detection time interval in the second step is as follows:
    comprehensively considering the requirements of fault diagnosis frequency and the requirements of interval time, the fault detection cycle is set, the duration of the fault detection cycle is k times of the duration of a code of the source signal binary sequence, and k is an integer not less than 10.

3. The method for implementing fault diagnosis by means of a spread spectrum carrier according to claim 1, wherein the frequency of the new source signal binary sequence is the same as that of the original source signal binary sequence.

4. The method for implementing fault diagnosis by means of a spread spectrum carrier according to claim 1, wherein the method of generating an SSPLCR signal in the fourth step comprises:
    Step 1, using the m sequence generated in the first step as a spread spectrum code, and performing periodic spread spectrum on a new source signal binary sequence;
    Step 2, modulating the periodic spread spectrum signal obtained in Step 1, wherein the modulation mode is BPSK, the frequency of the modulated sine wave is the same as the frequency of the m sequence code, and the SSPLCR signal is obtained after modulation; the signal has the power line carrier communication function and the power line fault detection and positioning ability, and the signal is used as a detection signal for digital-to-analog conversion, signal modulation and coupling into the power line for information transmission and fault diagnosis.

5. The method for implementing fault diagnosis by means of a spread spectrum carrier according to claim 1, wherein the method of synchronizing the SSPLCR signal sampled by the receiving terminal with the locally generated PN code in the fifth step comprises:
    Step 1, creating a local PN code generator at the receiving terminal to generate an m sequence, which is consistent with the frequency, series and primitive polynomial of the m sequence generated at the transmitting terminal;
    Step 2, roughly synchronizing the received signal by using a sliding synchronization module: inputting the product of the local PN code and the received signal into an integral judgment subsystem, performing integral operation, comparing the obtained integral value with a set threshold, judging whether the two signals are synchronized or not, and outputting a synchronization signal, wherein in this process, a phase search control module always controls a PN code generation module to adjust the code phase according to the synchronization signal, and if the output value of the integrator exceeds the threshold at a certain moment, it is regarded as successful capture;
    Step 3: using a digital delay-locked loop to precisely synchronize the received signal.

6. The method for implementing fault diagnosis by means of a spread spectrum carrier according to claim 1, wherein the method of despreading and demodulating the synchronization signal at the receiving terminal in the fifth step comprises:
    Step 1, multiplying the synchronized local PN code with the received signal, filtering by an intermediate frequency filter, removing the carrier frequency of a modulated signal, and keeping a fundamental frequency signal;
    Step 2, performing zero-crossing judgement on the output signal of the intermediate frequency filter, wherein it is judged as 1 if the output value is greater than 0, otherwise it is judged as 0; adding a counting judgment module to make $2^n-1$ zero-crossing judgment in a code cycle, where n is the series of the local PN code; when the detected zero-crossing times are greater than or equal to $2^{n-1}$, considering that the source signal is 1 in the code cycle; otherwise, judging that the source signal is 0 in the code cycle.

7. The method for implementing fault diagnosis by means of a spread spectrum carrier according to claim 1, wherein the method of judging the type and position of the cable fault in the fifth step comprises:
    Step 1, regarding the starting time the same as the starting time of sending the SSPLCR signal, and sampling the fault reflection signal of the receiving terminal according to the set fault detection cycle, wherein the sampling length is twice of the code cycle;
    Step 2, performing phase calibration on the sampled fault signal and the sent SSPLCR sequence; intercepting the sampling signal from the time of 0 code, 1 code . . . n codes, wherein the duration of intercepting the sampling point is one code cycle length; performing correlation operation on the intercepted sampling signal and the one-cycle spread spectrum code, respectively, calculating the size of a primary reflection peak, ranking the obtained primary reflection peak, performing comprehensive analysis combined with the spectrum energy value, and selecting the number m of delay codes capable of reflecting the fault information and amplifying the fault peak most obviously;

Step 3: from the m-th code time, intercepting the sampling signal of one code cycle length on the sampled fault signal, performing correlation operation with the one-cycle spread spectrum code, performing normalization processing, extracting the fault peak, judging the fault type, and positioning the fault distance.

\* \* \* \* \*